(12) United States Patent
Ueno

(10) Patent No.: US 7,320,250 B2
(45) Date of Patent: Jan. 22, 2008

(54) PRESSURE SENSING ELEMENT AND SENSOR INCORPORATING THE SAME

(75) Inventor: Masato Ueno, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/334,461

(22) Filed: Jan. 19, 2006

(65) Prior Publication Data

US 2006/0179953 A1 Aug. 17, 2006

(30) Foreign Application Priority Data

Feb. 16, 2005 (JP) ............................. 2005-038893

(51) Int. Cl.
G01L 9/00 (2006.01)
(52) U.S. Cl. .............................. 73/754; 73/715; 73/753
(58) Field of Classification Search .......... 73/700–756; 361/283.1–283.4
See application file for complete search history.

(56) References Cited

U.S. PATENT DOCUMENTS

| 4,257,274 A * | 3/1981 | Shimada et al. ............... 73/718 |
|---|---|---|
| 5,432,372 A * | 7/1995 | Ohtani ........................ 257/419 |
| 6,441,451 B1 * | 8/2002 | Ikeda et al. .................. 257/418 |
| 6,604,429 B1 * | 8/2003 | Pitzer ........................... 73/756 |
| 6,820,487 B2 * | 11/2004 | Esashi et al. ................. 73/705 |
| 2006/0162435 A1 * | 7/2006 | Watanabe ..................... 73/146 |

FOREIGN PATENT DOCUMENTS

| JP | A-5-248979 | 9/1993 |
|---|---|---|
| JP | A-11-14480 | 1/1999 |

* cited by examiner

*Primary Examiner*—Anore J. Allen
*Assistant Examiner*—Jermaine Jenkins
(74) *Attorney, Agent, or Firm*—Posz Law Group, PLC

(57) ABSTRACT

A pressure sensor includes a sensor chip in which a diaphragm is provided, and a case to which the sensor chip is directly mounted by an adhesive. A groove that surrounds the diaphragm is provided on the rear surface of the sensor chip between the bonded part and the diaphragm. The groove prevents thermal stress, which occurs at the bonded part, from reaching the diaphragm through the sensor chip, and thereby the accuracy of the sensor output is highly accurate. Further, the groove may store any excessive adhesive that may be applied when the sensor chip is bonded to the case to prevent the adhesive from flowing and adhering to the diaphragm.

30 Claims, 2 Drawing Sheets

PRESSURE SENSING ELEMENT AND SENSOR INCORPORATING THE SAME

CROSS REFERENCE TO RELATED APPLICATION

This application is based upon, claims the benefit of priority of, and incorporates by reference the contents of Japanese Patent Application No. 2005-038893 filed on Feb. 16, 2005.

FIELD OF THE INVENTION

The present invention relates generally to pressure sensors, and more specifically to a semiconductor pressure sensing element chip that has a diaphragm and that is joined directly to a case by an adhesive.

BACKGROUND OF THE INVENTION

Conventional semiconductor type pressure sensors include a sensor chip for sensing an applied pressure and a case for accommodating the sensor chip. The sensor chip includes a semiconductor substrate such as a silicon substrate and has a diaphragm that is deformable in accordance with an applied pressure.

As disclosed in JP-A-H11-14480, a sensor chip of a conventional pressure sensor is fixed to the case via a glass pedestal. The glass pedestal has a through hole for introducing pressure to the diaphragm of the sensor chip, and the sensor chip is mounted thereon by anodic bonding. The glass pedestal is fixed on the case by an adhesive.

Herein, the glass pedestal is composed of Pyrex® glass, for example, in order to adjust the coefficient of thermal expansion thereof to that of the sensor chip, and has a certain height to space the sensor chip from a bonded part between the glass pedestal and the case. By the glass pedestal spacing the sensor chip from the bonded part, a stress such as a thermal stress generated at the bonded part is prevented from reaching the sensor chip.

As described above, the glass pedestal reduces thermal stress that would otherwise affect the sensor chip. Therefore, if the glass pedestal is omitted and the sensor chip is mounted directly on the case, thermal shock, which is generated during and after adhesion at the bonded part, is applied to the sensor chip. This strains the diaphragm of the sensor chip and negatively affects the sensor characteristics.

The above mentioned thermal shock may be composed of various stresses such as a stress applied directly on the sensor chip during adhesion, a stress due to the differences in coefficients of linear thermal expansion among the sensor chip, the case and the adhesive, and a stress due to the creep or plastic deformation of the case.

Furthermore, in case the sensor chip is mounted directly on the case by the adhesive, the adhesive may extend to the diaphragm of the sensor chip and adhere to the diaphragm. This increases the possibility of that the sensor characteristics of the sensor chip are negatively affected. This is because the surface tension of the adhesive used to bond this kind of sensor chip is generally small.

SUMMARY OF THE INVENTION

In view of the foregoing problem, it is an object of the present invention to provide a sensing element that can prevent stress generated at a joint portion from affecting a stress accepting portion if the sensing element is directly affixed to a case.

Another object of the present invention is to provide a sensing element having a structure that prevents an adhesive from adhering to a stress accepting portion if the sensing element is joined to a case directly using the adhesive.

A sensing element according to a first aspect of the present invention includes a substrate having a stress-accepting portion and a joint portion, and a structure provided in the substrate and located between the stress-accepting portion and the joint portion for restraining stress in the substrate. The structure for restraining stress prevents stress that occurs at the joint portion from reaching the stress-accepting portion. Therefore, as the stress-accepting portion is isolated from the stress generated at the joint portion, the accuracy of the sensor output that is indicative of stress that is sensed at the stress-accepting portion is increased.

A sensing element according to a second aspect of the present invention includes a substrate having a stress-accepting portion and a joint portion, and a structure provided on a surface of the substrate at a side of the joint portion and located between the stress-accepting portion and the joint portion for pooling an adhesive. The structure for pooling an adhesive stores any excess adhesive that may be applied to adhere the sensing element to a sensor case and prevents the adhesive from flowing and adhering to the stress-accepting portion. Therefore, since the stress-accepting portion remains free of the adhesive, sensor accuracy is maintained while overall sensor cost is reduced, as a glass pedestal for separating the sensing element from the case is not required.

A sensing element according to a third aspect of the present invention is characterized by a groove provided on a surface of the substrate at a side of the joint portion and located between the stress-accepting portion and the joint portion as the structure in the above first or second aspects. The groove may be formed to continuously or discontinuously surround the stress-accepting portion. In case the groove continuously surrounds the stress-accepting portion, it may be preferred to collect the excessive adhesive effectively. Furthermore, a supplemental groove may be provided to continuously or discontinuously surround the joint portion.

BRIEF DESCRIPTION OF THE DRAWINGS

The above and other objects, features and advantages of the present invention will become more apparent from the following description of the preferred embodiments given with reference to the attached drawings, wherein.

DETAILED DESCRIPTION OF THE PREFERRED EMBODIMENTS

Figure 1:
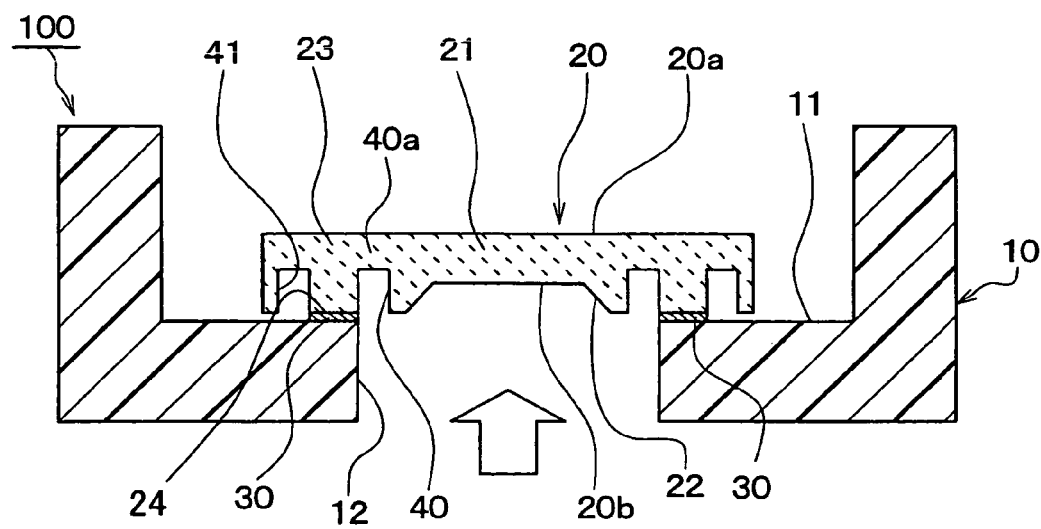
FIG. 1 is a schematic cross sectional view showing a pressure sensor according to a first embodiment of the present invention.

Preferred embodiments according to the present invention will be described hereunder with reference to the accompanying drawings. In the drawings, the same reference numerals are given to the corresponding or similar parts, in order to simplify explanation.

As shown in FIG. 1, a pressure sensor 100 of a first embodiment is equipped with a case 10 and a semiconductor sensor chip 20 for pressure sensing that is attached to the case 10. The sensor chip 20 has a diaphragm 21 as a pressure-sensitive portion, or more generally a stress-accepting portion that is distorted when pressure is applied thereto. The pressure sensor 100 is structured so that the sensor chip 20 is directly fixed by an adhesive 30 to the case 10.

The case 10 forms the outline of the pressure sensor 100, and is formed by molding a resin material, such as PBT (polybutylene terephthalate), PPS (polyphenylene sulfide) or the like. In addition, the case 10 may be fabricated from materials other than resin, such as ceramics or metal.

The case 10 has a chip mounting portion 11 and a pressure introduction hole 12 which is a penetration hole established in the chip mounting portion 11. The sensor chip 20 is mounted on the chip mounting portion 11 by the adhesive 30 so that the diaphragm 21 of the sensor chip 20 and the pressure introduction hole 12 of the case 10 are opposed to each other.

The sensor chip 20 has the diaphragm 21 that is formed in a thin membrane configuration to be distorted in accordance with the application of pressure. In FIG. 1, the diaphragm 21 is located on a front surface side 20a of the sensor chip 20, and a concavity 22 for constituting the diaphragm 21 is located on a rear surface side 20b, which is an adhesion side of the sensor chip 20. The concavity 22 can be formed by, for example, anisotropically etching a semiconductor substrate for the sensor chip 20 from the backside thereof.

A thick portion 23 of the sensor chip 20 that surrounds the diaphragm 21 includes a joint portion 24 that is directly fixed to the chip mounting portion 11 of the case 10 by the adhesive 30 at the rear surface side 20b of the sensor chip 20. Regarding the adhesive 30, resin adhesives that exhibit, for example, adhesion by hardening may be used. Specifically, soft adhesives such as, for example, silicone system adhesives, fluorosilicone or phlorosilicone system adhesives, may be used as the adhesive 30 so that thermal stress generated at the bonded part of the sensor chip 20 and the case 10 does not significantly affect sensor characteristics.

Figure 2:
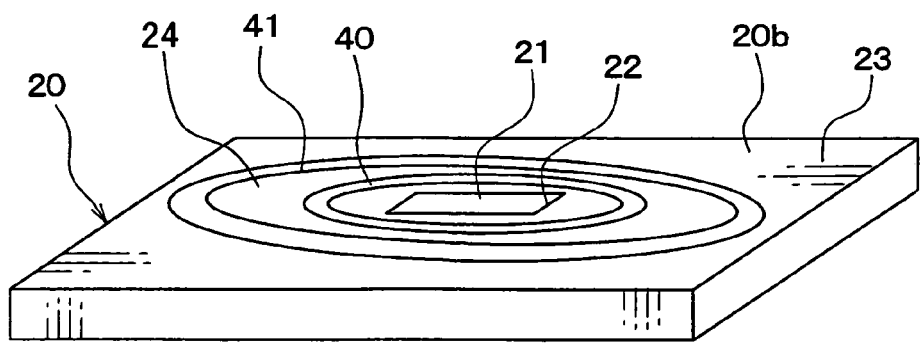
FIG. 2 is a schematic perspective view showing a side of an adhesion surface of a sensor chip of the pressure sensor.

Furthermore, in the present embodiment, a structure for restraining stress in the substrate, or more specifically a first annular groove 40, is provided on the rear surface side 20b, which is the adhesion side of the sensor chip 20 as shown in FIGS. 1 and 2. The first annular groove 40 is arranged within the thick part 23 of the sensor chip 20 and between the diaphragm 21 and the bonded part where the adhesive 30 is applied, and surrounds the diaphragm 21. Since the thickness of the substrate of the sensor chip 20 is thinned by the formation of the first annular groove 40 (see thinned portion 40a in FIG. 1), it is difficult for the thermal stress generated at the bonded part to spread toward the diaphragm 21. Moreover, the first annular groove 40 serves as a region for pooling the adhesive 30, and thus, excessive adhesive that may be applied to bond the sensor chip 20 to the case 10 is prevented from flowing and adhering to the rear side of the diaphragm 21.

Furthermore, a second annular groove 41 is provided on the rear surface 20b of the sensor chip 20 in the thick portion 23 to surround the bonded part where the adhesive 30 is applied. This supplemental groove 41 also serves as a region for pooling any excessive adhesive to prevent the excessive adhesive from flowing outwardly.

The grooves 40 and 41 may be formed to continuously or discontinuously surround the diaphragm 21. If the grooves 40 and 41 are formed so as to continuously surround the diaphragm 21 as shown in FIG. 2, such a groove configuration both effectively prevents thermal stress from affecting the diaphragm and collects excessive adhesive.

Figure 3A:
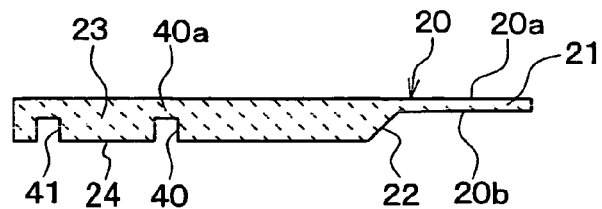
FIGS. 3A, 3B and 3C are schematic cross sectional views showing various groove structures, respectively.
Figure 3B:
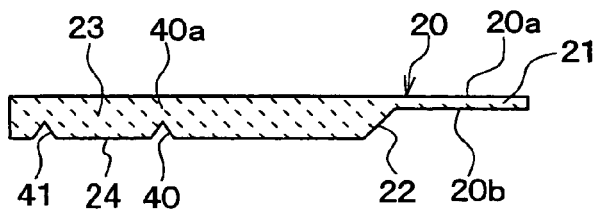
Figure 3C:
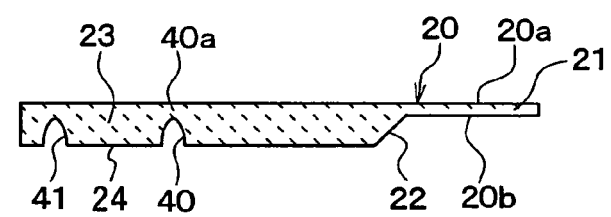

Moreover, the shapes of the first and second grooves 40 and 41, i.e., the cross-sectional shapes of the grooves, may have, for example, a rectangular geometry, a triangular geometry (V-shape), or a U-shaped geometry as shown in FIGS. 3A, 3B and 3C, respectively.

These first and second grooves 40 and 41 can be easily formed by chemical processing methods, such as wet etching, dry etching or the like, and also by physical processing methods, such as, for example, sandblasting, electrical discharge machining, polishing or grinding.

Figure 4:
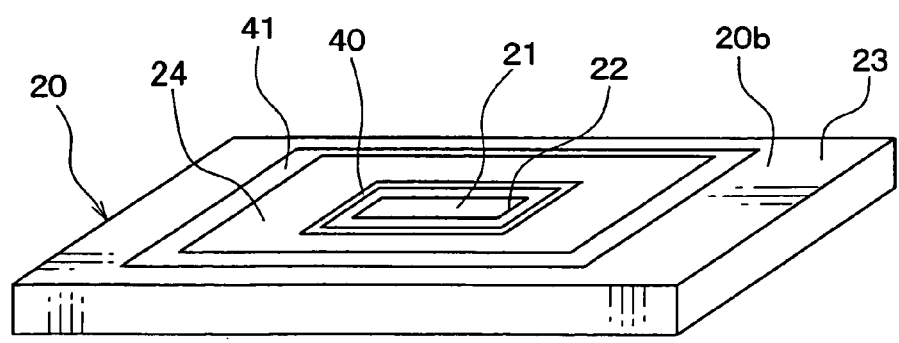
FIG. 4 is a schematic perspective view showing a side of an adhesion surface of a sensor chip of a second embodiment of the present invention.

Moreover, although the arrangement pattern of the first and second grooves 40 and 41 in the first embodiment are circular as shown in FIG. 2, the arrangement pattern of these grooves 40 and 41 is not limited to such a pattern. The arrangement pattern of these grooves 40 and 41 can be modified suitably in association with geometry of the pressure introduction hole 12 or an arrangement pattern of the adhesive 30. For example, the arrangement pattern of the first and second grooves 40 and 41 may be a rectangular frame configuration, like a second embodiment shown in FIG. 4. Furthermore, various annular arrangement patterns such as a triangulate ring, a polygonal ring, an ellipse or the like may be used.

The number of the first and second grooves 40 and 41 may be two or more. Of course, it may be applicable that one of the first and second grooves 40 and 41 may be a single groove with the other being two or more grooves.

On the front surface side 20a of the sensor chip 20, a detection circuit (not shown) is formed. The detection circuit may include a bridge circuit, which is constituted on the diaphragm 21 using diffused piezo-resistors, for example. The detection circuit generates an output signal, the level of which corresponds to the distortion, i.e., the magnitude of the pressure applied to the diaphragm 21.

Furthermore, although not illustrated in FIG. 1, the case 10 has a connector for making an electrical connection with outside circuitry to which the sensor chip 20 is electrically connected via bonding wires (not shown) composed of Au or Al. The connector, which may be insert molded into the case 10, is formed from conductor materials, such as copper and 42 alloys (Fe-42Ni), for example.

The abovementioned pressure sensor 100 can be used as a relative type pressure sensor, for example. The diaphragm 21 of the relative type pressure sensor is distorted by differential pressure between a pressure applied to the diaphragm 21 from the front surface side 20a of the sensor chip 20 and a pressure applied to the diaphragm 21 from the rear surface side 20b, with pressure sensing being performed based on the resulting distortion of the diaphragm 21.

Such a relative type pressure sensor 100 may be applicable as a sensing component in, for example, an exhaust gas purification system (DPF, diesel particulate filter, system) of a diesel engine for a vehicle to detect the pressure of exhaust gas, for example. In this case, the pressure of exhaust gas upstream of the DPF in an exhaust pipe is introduced to the front surface side 20a of the sensor chip 20, and the pressure of exhaust gas downstream of the DPF in the exhaust pipe is introduced to the rear surface side 20b of the sensor chip 20. Then, the diaphragm 21 is distorted by differential of the pressures respectively applied to the diaphragm 21 from the front surface side 20a and from the rear surface side 20b, and the output signal corresponding to the distortion of the diaphragm 21 is output through the bonding wires and the connector.

In the aforementioned system, exhaust gas has a strong corrosiveness. Therefore, when adopting the pressure sensor 100 in an exhaust gas system, both sides 20*a* and 20*b* of the sensor chip 20 may be covered with gel material resistible to corrosion.

As described above, according to the exemplary preferred embodiments of the present invention, the first groove 40 is provided on the thick part 23 of the sensor chip located between the diaphragm 21 and the bonded part where the adhesive 30 is applied. Therefore, the first groove 40 prevents thermal stress, which occurs at the bonded part, from traveling through the substrate of the sensor chip 20 and reaching the diaphragm 21. As the diaphragm 21 is not affected by the thermal stress generated at the bonded part, the accuracy of the sensor output for the pressure measured at the diaphragm 21 can be maintained at a high level. Further, the first groove 40 may store an excessive adhesive that may be applied to adhere the sensor chip 20 to the case 10 to prevent the adhesive from flowing and adhering to the diaphragm 21. Since the diaphragm 21 remains free of the adhesive 30, the accuracy of the sensor output can be further enhanced.

Moreover, since the first groove 40 is provided on the sensor chip 20, the case 10 for mounting the sensor chip 20 need not include any such groove.

Furthermore, in the above embodiments, the second groove 41, which surrounds the bonded part, is additionally provided to store excessive adhesive and thereby prevent the adhesive from flowing outwardly. However, this second groove 41 may be omitted from the sensor chip 20.

In addition, although the above-mentioned embodiments show the case 10 where the adhesion side of the sensor chip 20 is the rear surface side 20*b*, it may be also applicable that a front surface side 20*a* is considered as an adhesion side. That is, the front surface side 20*a* in which the diaphragm 21 is formed may be bonded to a chip mounting portion 11 of a case 10. In this case, the first groove 40 may be arranged on the front surface side 20*a* and between the diaphragm 21 and a bonded part.

The sensor chip may have any configurations as long as it has a diaphragm that is distortable in response to an applied pressure. The case for mounting the sensor chip may include a circuit board composed of ceramics, for example. The pressure sensor may be an absolute pressure sensor besides the above-mentioned relative type. The absolute pressure sensor may detect a measurement pressure impressed on one surface of a diaphragm with a reference vacuum pressure applied to the other surface. Moreover, the pressure sensor of the present invention may be applied to a variety of uses besides the exhaust pressure sensing mentioned above.

While the invention has been described with reference to preferred embodiments thereof, it is to be understood that the invention is not limited to the preferred embodiments and constructions. The invention is intended to cover various modifications and equivalent arrangements. In addition, the various combinations and configurations, which are preferred, other combinations and configurations, including more, less or only a single element, are also within the spirit and scope of the invention.

What is claimed is:

1. A sensing element comprising:
    a substrate having a stress-accepting portion and a joint portion; and
    a structure formed between the stress-accepting portion and the joint portion for restraining stress in the substrate, wherein
    the stress-accepting portion includes a diaphragm and a thick part, the thick part being disposed on a periphery of the diaphragm, and the structure being disposed in the thick part,
    the structure comprises a groove formed in a surface of the substrate where the joint portion is located, and
    the joint portion surrounds the stress-accepting portion, and the groove is located between the joint portion and the stress-accepting portion to surround the stress-accepting portion.

2. The sensing element according to claim 1, wherein the groove is annularly shaped to continuously surround the stress-accepting portion.

3. The sensing element according to claim 1, wherein the substrate has a supplemental groove formed in the surface of the substrate where the joint portion is located to surround the joint portion.

4. The sensing element according to claim 1, wherein the stress-accepting portion comprises a diaphragm of a membrane structure.

5. The sensing element according to claim 4, wherein the diaphragm and the joint portion are formed on opposite surfaces of the substrate.

6. A sensing element comprising:
    a substrate having a stress-accepting portion and a joint portion; and
    a structure provided on a surface of the substrate adjacent the joint portion for pooling an adhesive, the structure being located between the stress-accepting portion and the joint portion, wherein
    the stress-accepting portion includes a diaphragm and a thick part,
    the thick part is disposed on a periphery of the diaphragm,
    the structure is a groove disposed in the thick part, and
    the joint portion surrounds the stress-accepting portion, and the groove is located between the joint portion and the stress-accepting portion to surround the stress-accepting portion.

7. The sensing element according to claim 6, wherein the groove is annularly shaped and continuously surrounds the stress-accepting portion.

8. The sensing element according to claim 6, wherein the substrate includes a supplemental groove surrounding the joint portion on the surface where the joint portion is located.

9. The sensing element according to claim 6, wherein the stress-accepting portion comprises a diaphragm of a membrane structure.

10. The sensing element according to claim 9, wherein the diaphragm and the joint portion are provided on opposite surfaces of the substrate.

11. A pressure sensor comprising:
    a sensing element having a joint portion and a diaphragm that is deformable when pressure is applied thereto;
    a case on which the sensing element is mounted at the joint portion; and
    an adhesive fixing the sensing element to the case, wherein
    the sensing element has a groove provided on a surface thereof adjacent the joint portion, the groove being located between the diaphragm and the joint portion, wherein
    the sensing element further includes a thick part,
    the thick part is disposed on a periphery of the diaphragm, the groove is disposed in the thick part, and the joint portion surrounds the diaphragm, and the groove is located between the joint portion and the diaphragm to surround the diaphragm.

12. The pressure sensor according to claim 11, wherein the groove is annularly shaped and continuously surrounds the diaphragm.

13. The pressure sensor according to claim 11, wherein the substrate includes a supplemental groove surrounding the joint portion on the surface where the joint portion is located.

14. The pressure sensor according to claim 13, wherein the supplemental groove is annularly shaped and continuously surrounds the joint portion.

15. The pressure sensor according to claim 11, wherein the diaphragm and the joint portion are provided on opposite surfaces of the sensing element.

16. A sensing element comprising:
a substrate having a stress-accepting portion and a joint portion; and
a structure formed between the stress-accepting portion and the joint portion for restraining stress in the substrate, wherein
the structure is capable of restraining the stress generated from the joint portion,
the stress-accepting portion detects pressure in such a manner that a distortion of the stress-accepting portion corresponds to the pressure,
the structure comprises a groove formed in a surface of the substrate where the joint portion is located, and
the joint portion surrounds the stress-accepting portion, and the groove is located between the joint portion and the stress-accepting portion to surround the stress-accepting portion.

17. The sensing element according to claim 16, wherein the groove is annularly shaped to continuously surround the stress-accepting portion.

18. The sensing element according to claim 16, wherein the substrate has a supplemental groove formed in the surface of the substrate where the joint portion is located to surround the joint portion.

19. The sensing element according to claim 16, wherein the stress-accepting portion comprises a diaphragm of a membrane structure.

20. The sensing element according to claim 19, wherein the diaphragm and the joint portion are formed on opposite surfaces of the substrate.

21. A sensing element comprising:
a substrate having a stress-accepting portion and a joint portion; and
a structure provided on a surface of the substrate adjacent the joint portion for pooling an adhesive, the structure being located between the stress-accepting portion and the joint portion, wherein
the structure is a groove capable of restraining the stress generated from the joint portion,
the stress-accepting portion detects pressure in such a manner that a distortion of the stress-accepting portion corresponds to the pressure, and
the joint portion surrounds the stress-accepting portion, and the groove is located between the joint portion and the stress-accepting portion to surround the stress-accepting portion.

22. The sensing element according to claim 21, wherein the groove is annularly shaped and continuously surrounds the stress-accepting portion.

23. The sensing element according to claim 21, wherein the substrate includes a supplemental groove surrounding the joint portion on the surface where the joint portion is located.

24. The sensing element according to claim 21, wherein the stress-accepting portion comprises a diaphragm of a membrane structure.

25. The sensing element according to claim 24, wherein the diaphragm and the joint portion are formed on opposite surfaces of the substrate.

26. A pressure sensor comprising:
a sensing element having a joint portion and a diaphragm that is deformable when pressure is applied thereto; and
a case on which the sensing element is mounted at the joint portion; and
an adhesive fixing the sensing element to the case, wherein
the sensing element has a groove provided on a surface thereof adjacent the joint portion, the groove being located between the diaphragm and the joint portion,
the groove is capable of restraining the stress generated from the joint portion,
the diaphragm detects pressure in such a manner that a distortion of the stress-accepting portion corresponds to the pressure, and
the joint portion surrounds the diaphragm, and the groove is located between the joint portion and the diaphragm to surround the diaphragm.

27. The pressure sensor according to claim 26, wherein the groove is annularly shaped and continuously surrounds the diaphragm.

28. The pressure sensor according to claim 26, wherein the substrate includes a supplemental groove surrounding the joint portion on the surface where the joint portion is located.

29. The pressure sensor according to claim 28, wherein the supplemental groove is annularly shaped and continuously surrounds the joint portion.

30. The pressure sensor according to claim 26, wherein the diaphragm and the joint portion are formed on opposite surfaces of the sensing element.

* * * * *